US012732769B2

(12) United States Patent
Guglielmone, Jr.

(10) Patent No.: US 12,732,769 B2
(45) Date of Patent: Sep. 8, 2026

(54) CORRECTING AUDIO SIGNALS BASED ON AN ORIENTATION OF AN EYEWEAR ASSEMBLY

(71) Applicant: Apple Inc., Cupertino, CA (US)

(72) Inventor: Ronald J. Guglielmone, Jr., Redwood City, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 18/734,923

(22) Filed: Jun. 5, 2024

(65) Prior Publication Data

US 2025/0071498 A1 Feb. 27, 2025

Related U.S. Application Data

(60) Provisional application No. 63/578,590, filed on Aug. 24, 2023.

(51) Int. Cl.
*H04R 5/02* (2006.01)
*H04R 1/10* (2006.01)
*H04S 7/00* (2006.01)

(52) U.S. Cl.
CPC ........... *H04S 7/303* (2013.01); *H04R 1/1008* (2013.01); *H04S 2400/13* (2013.01); *H04S 2420/01* (2013.01)

(58) Field of Classification Search
CPC .. H04S 7/303; H04S 2400/13; H04S 2420/01; H04R 1/1008
USPC .................................................... 381/303, 59
See application file for complete search history.

(56) References Cited

U.S. PATENT DOCUMENTS

| | | | | |
|---|---|---|---|---|
| 5,404,385 | A * | 4/1995 | Ben-Haim | H04B 1/086 377/5 |
| 8,788,977 | B2 * | 7/2014 | Bezos | G06F 3/013 715/773 |
| 9,998,847 | B2 * | 6/2018 | Norris | H04S 1/007 |
| 10,070,224 | B1 * | 9/2018 | Miller | G02B 27/0172 |
| 10,206,053 | B1 | 2/2019 | Welti | |
| 10,375,506 | B1 * | 8/2019 | Moeller | G06F 3/165 |
| 10,602,302 | B1 * | 3/2020 | Lyren | G06F 3/012 |
| 10,890,965 | B2 * | 1/2021 | Tobin | G06F 3/017 |
| 11,595,754 | B1 * | 2/2023 | Johnson | G06F 30/20 |
| 11,809,774 | B1 * | 11/2023 | Vitt | H04R 1/1008 |
| 12,170,883 | B2 * | 12/2024 | Marculescu | H04S 7/304 |
| 2011/0144779 | A1 | 6/2011 | Janse et al. | |
| 2019/0174237 | A1 * | 6/2019 | Lunner | H04R 1/1041 |
| 2019/0342647 | A1 * | 11/2019 | Mehra | H04R 17/00 |
| 2019/0373357 | A1 * | 12/2019 | Khaleghimeybodi | H04R 1/1041 |
| 2021/0243544 | A1 * | 8/2021 | Tracey | H04S 3/004 |
| 2022/0182777 | A1 * | 6/2022 | Canberk | G02B 27/017 |

(Continued)

*Primary Examiner* — William J Deane, Jr.
(74) *Attorney, Agent, or Firm* — Aikin & Gallant, LLP

(57) ABSTRACT

An eyewear assembly may include a frame configured to rest on a wearer's face, a plurality of extra-aural speakers, and a plurality of sensors. A processing circuitry may execute instructions stored in memory to process output data of the plurality of sensors to determine locations of a plurality of anatomic features of the wearer, detect an orientation of the eyewear assembly relative to the wearer of the eyewear assembly based on the locations of the plurality of anatomic features of the wearer, and determine, based on the orientation, a correction to an audio signal that is to drive an extra-aural speaker of the plurality of extra-aural speakers. Other aspects are also described and claimed.

23 Claims, 5 Drawing Sheets

(56) References Cited

U.S. PATENT DOCUMENTS

| | | | | |
|---|---|---|---|---|
| 2022/0191578 | A1* | 6/2022 | Ramkumar | G02B 27/0176 |
| 2022/0377486 | A1* | 11/2022 | Arya | H04S 7/303 |

* cited by examiner

CORRECTING AUDIO SIGNALS BASED ON AN ORIENTATION OF AN EYEWEAR ASSEMBLY

RELATED APPLICATIONS

This patent application claims the benefit of priority of U.S. Provisional Application No. 63/578,590, filed Aug. 24, 2023, which is incorporated herein by reference in its entirety.

BACKGROUND

Field

This disclosure relates generally to audio signals driven to extra-aural speakers, and more specifically to correcting audio signals driven to extra-aural speakers of an eyewear assembly based on an orientation of the eyewear assembly. Other aspects are also described.

Background Information

Extra-aural speakers may enable sound to be projected in an environment that is near a user's ear without covering or otherwise obstructing the ear. For example, extra-aural speakers could be attached to headgear that is designed to be worn on the head of the user. The extra-aural speakers can then project sounds in directions external to the user's ears without physically covering the ears. This may enable the sounds to combine with other sounds in the environment, such as the user's own voice. This may also enable the wearer of the headgear to avoid wearing hardware in or on their ears.

SUMMARY

Implementations of this disclosure include configuring sensors coupled to an eyewear assembly to detect an orientation of the eyewear assembly relative to anatomic features of a wearer of the eyewear assembly, e.g., the user. An output from the sensors may be used to adjust audio signals driven to extra-aural speakers that are coupled to the eyewear assembly based on the orientation detected. In some implementations, the eyewear assembly may include a frame configured to rest on a wearer's face, a plurality of arms or a band extending from the frame and configured to rest on ears of a wearer, a plurality of extra-aural speakers coupled to the frame or to the plurality of arms or band, and a plurality of sensors coupled to the frame or to the plurality of arms or band. One or more processors or processing circuitries may execute instructions stored in memory to process output data of the plurality of sensors to determine locations of a plurality of anatomic features of the wearer, to detect an orientation of the eyewear assembly relative to the wearer of the eyewear assembly based on the locations of the plurality of anatomic features of the wearer, and to determine, based on the orientation, a correction to an audio signal that is to drive an extra-aural speaker of the plurality of extra-aural speakers. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
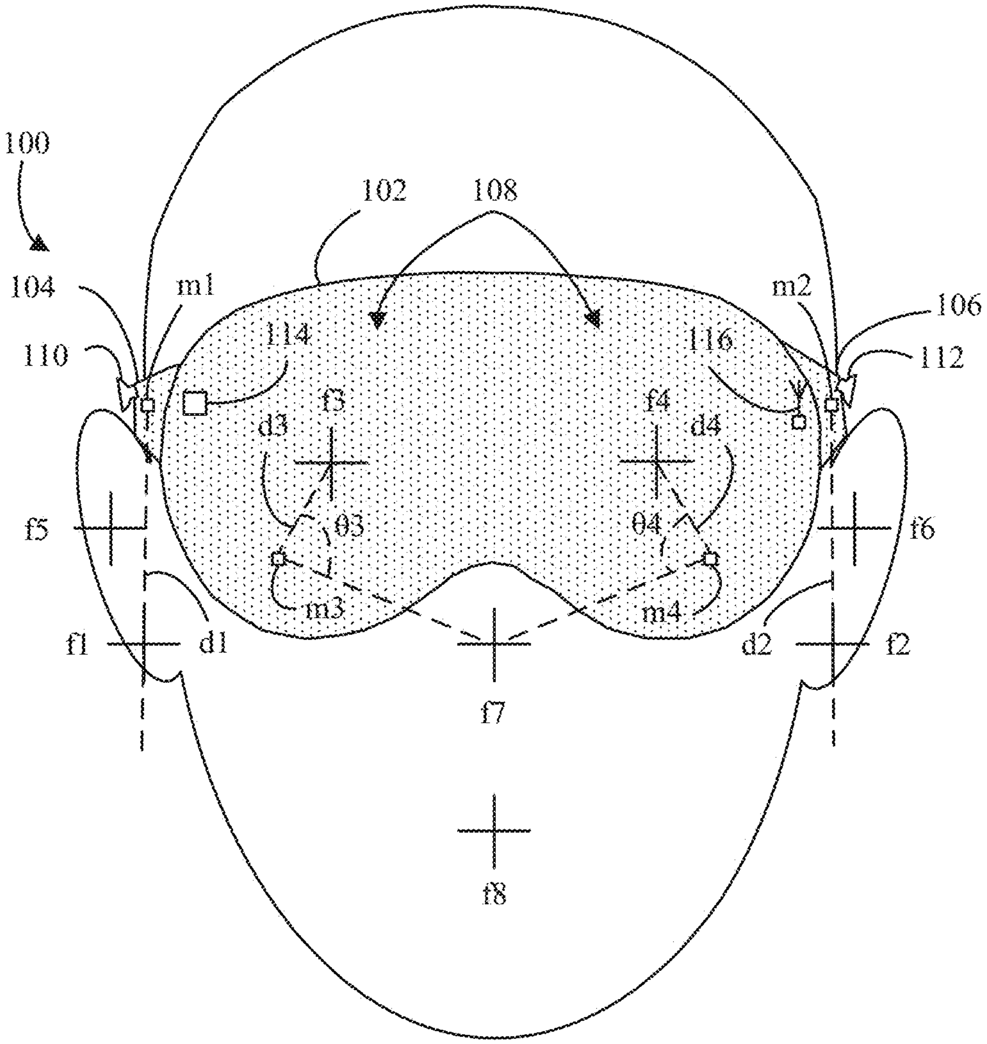
FIG. 1 is an example of a front view of an eyewear assembly worn by a user.

Extra-aural speakers attached to headgear worn by a user can sometimes fall out of position. For example, when a wearer (the user) of the headgear experiences excessive movement and/or perspiration, the headgear can slip on the wearer's head. This can cause extra-aural speakers attached to the headgear to also move out of position, resulting in subsequent sounds projected from the extra-aural speakers being imbalanced. For example, when the headgear falls out of position, one speaker may move further away from the user's ear, while another speaker moves closer to the user's ear, causing an undesirable change in sounds experienced by the wearer. In some cases, even without the headgear slipping, a user may still experience imbalanced audio from the extra-aural speakers. For example, the user may have asymmetric anatomic features, e.g., one ear offset higher than the other ear, or an uneven head or nose, causing the extra-aural speakers to be out of alignment.

Implementations of this disclosure address problems such as these by configuring sensors coupled to an eyewear assembly to detect an orientation of the eyewear assembly relative to anatomic features of a wearer. For example, the eyewear assembly could be smart glasses or goggles, e.g., eyeglasses with circuitry. An output from the sensors may be used to adjust audio signals driven to extra-aural speakers that are coupled to the eyewear assembly based on the orientation that is detected. In some implementations, the eyewear assembly may include a frame configured to rest on a wearer's face, a plurality of arms or a band extending from the frame and configured to rest on ears of a wearer, a plurality of extra-aural speakers coupled to the frame or to the plurality of arms or band, and a plurality of sensors coupled to the frame or to the plurality of arms or band. One or more processors or processing circuitries may execute instructions stored in memory to process output data of the plurality of sensors to determine locations of a plurality of anatomic features of the wearer, to detect an orientation of the eyewear assembly relative to the wearer of the eyewear assembly based on the locations of the plurality of anatomic features of the wearer, and to determine, based on the orientation, a correction to an audio signal that is to drive an extra-aural speaker of the plurality of extra-aural speakers. As a result, a user may be able to hear sounds in a balanced manner, regardless of whether extra-aural speakers move out of position due to excessive movement and/or perspiration, and/or regardless of whether the user has asymmetric anatomic features that cause the extra-aural speakers to be out of alignment.

In some implementations, an eyewear assembly system may utilize sensors to track the locations of anatomic features of a user and to compensate for movement, tilt, and/or obstructions when worn by the user. The sensors could include, for example, ultrasonic sensors, optical sensors, cameras, laser range finder (e.g., a light detection and ranging (LIDAR) system), electro-mechanical sensors, capacitive touch sensors, and/or strain gauge sensors. The sensors may enable the system to detect anatomic feature of the user, such as eyes, pupils, ears, earlobes, ear canals, a nose, or a mouth. In some implementations, the system can utilize machine learning to predict the anatomic features with confidence percentages. The system can utilize the sensors to determine distances and/or angles to centroids of the anatomic features. If the system confirms that the anatomic features are balanced to within a threshold, the system need not apply a correction to audio signals (audio output) driven to the extra-aural speakers (e.g., the audio signals may be driven normally without additional processing). However, if the system determines that the anatomic features are imbalanced (e.g., differences between distances and/or angles exceeding the threshold), then the system can apply signal processing to correct one or more audio signals driven to one or more of the extra-aural speakers to achieve balancing. In some implementations, applying the correction may include applying a level compensation, an equalization adjustment, and/or an HRTF correction. In some implementations, the system may utilize the sensors to detect objects causing obstructions to the extra-aural speakers. For example, the sensors may detect hair and/or clothing between the user's ears and the extra-aural speakers. The system can then determine corrections to audio signals driven to the extra-aural speakers based on the objects causing the obstructions (e.g., to compensate, in the audio signals, for the hair and/or clothing).

In some implementations, the system may utilize sensors to determine an amount of asymmetry, then correct for the amount of asymmetry in an audio output (e.g., audio signals). For example, a user with asymmetrical features may ear imbalanced audio. To enable the user to receive the same experience as others, the system may use sensors to track the location of the user's anatomic features and compensate for tilt. The sensors may include, for example, ultrasonic, optical, camera, laser range finder, electro-mechanical, capacitive touch, and/or strain gauge sensors. The system may utilize the sensors to generate signals that may include, for example, feature detections (e.g., earlobes, eyes, hair, etc.), each with a confidence percentage, distances to centroids of the feature, and/or angles to centroids of the feature. If the system determines the amount of asymmetry is minimal or below a threshold (e.g., a level of symmetry being present, corresponding to balanced), the system does not apply a correction to the audio output. However, if the system determines the amount of asymmetry is above a threshold (e.g., a level of asymmetry being present, corresponding to imbalanced), the system does apply a correction to the audio output vis signal processing. The correction could include, for example, level compensation, equalization, and/or HRTF correction. In some implementations, the amount of asymmetry and/or correction may be determined based on amount of hair of the user affecting the system.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 2:
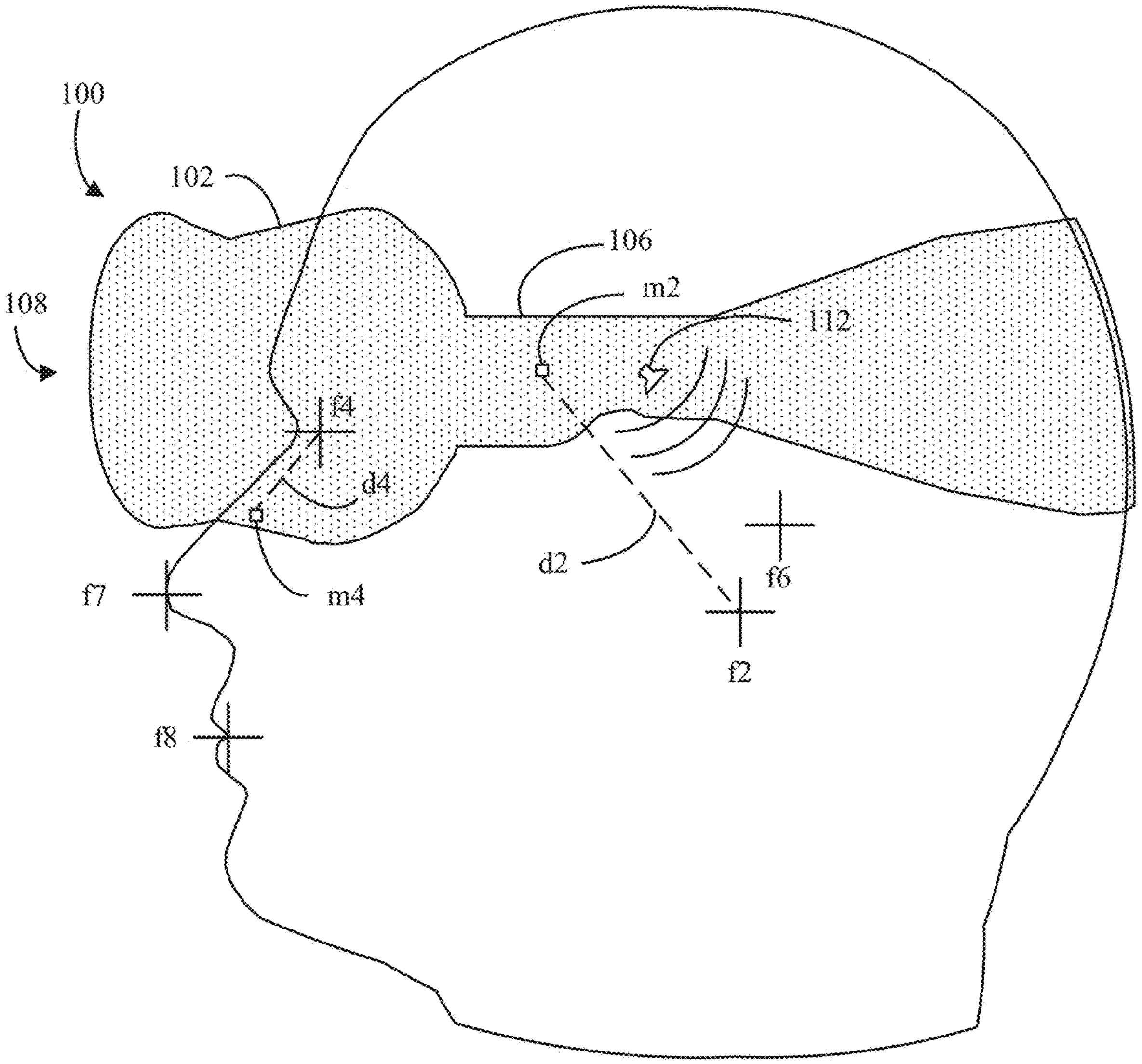
FIG. 2 is an example of a side view of an eyewear assembly worn by a user.

FIG. 1 is an example of a front view of an eyewear assembly 100 worn by a user, and FIG. 2 is an example of a side view of the eyewear assembly 100 worn by the user. The eyewear assembly 100 may be part of a system that enables correcting audio signals based on an orientation of the eyewear assembly 100 relative to anatomic features of the wearer. The eyewear assembly 100 may include a frame 102 configured to rest on the wearer's face, and a plurality of arms or a band extending from the frame 102 (which may be configured to rest on ears of the wearer, such as a right arm 104 and a left arm 106, or on sides of the wearer's head). For example, the eyewear assembly 100 could be smart glasses or goggles, e.g., eyeglasses with circuitry, which may optionally include lenses or shields 108 in front of the wearer's eyes.

The eyewear assembly 100 may also include a plurality of extra-aural speakers coupled to the frame 102 or to the plurality of arms or band, such as a right extra-aural speaker 110 coupled to the right arm 104 (e.g., near the wearer's right ear) and a left extra-aural speaker 112 coupled to the left arm 106 (e.g., near the wearer's left ear). The extra-aural speakers may enable sound to be projected in an environment near the wearer's ears without covering or otherwise obstructing the ears. This may enable sounds to combine with other sounds in the environment, including the wearer's own voice. This may also enable the wearer to avoid wearing hardware in or on their ears (e.g., ear buds). In some implementations, the plurality of extra-aural speakers may be integrated in the frame 102 or in the plurality of arms or band when manufactured (e.g., the plurality of extra-aural speakers may be configured to mate with mechanical features in the frame 102 and/or the plurality of arms or band to hold them in a fixed position).

The eyewear assembly 100 may also include a plurality of sensors coupled to the frame 102 or to the plurality of arms or band, such as sensors m1-m4. For example, sensor m1 may be coupled to the right arm 104; sensor m2 may be coupled to the left arm 106; sensor m3 may be coupled to a right side of the frame 102; and sensor m4 may be coupled to a left side of the frame 102. The sensors m1-m4 could include a combination of ultrasonic sensors, optical sensors, cameras, laser range finders (e.g., LIDAR systems), electro-mechanical sensors, capacitive touch sensors, and/or strain gauge sensors. In some implementations, the plurality of sensors may be integrated in the frame 102 or in the plurality of arms or band when manufactured (e.g., the plurality of sensors may be configured to mate with mechanical features in the frame 102 and/or the plurality of arms or band to hold them in a fixed position).

The eyewear assembly 100 may be part of a system that enables correcting one or more audio signals driven to the plurality of extra-aural speakers (e.g., the right extra-aural speaker 110 and/or the left extra-aural speaker 112) based on an orientation of the eyewear assembly 100 relative to anatomic features of the wearer. The system may utilize the sensors m1-m4 to track the locations of the anatomic features of the wearer and to compensate for movement, tilt, and/or obstructions when the eyewear assembly 100 is worn by the user. For example, the anatomic features of the wearer may include a right earlobe f1, a left earlobe f2, a right eye f3, a left eye f4, a right ear canal f5, a left ear canal f6, a nose f7, and a mouth f8. The system may utilize one or more processors or processing circuitries to execute instructions stored in memory to correct audio signals based on an orientation of the eyewear assembly 100 relative to one or more of the anatomic features f1-f8.

In some implementations, the eyewear assembly 100 may include the one or more processors and memory, such as a system on a chip (SoC) 114 coupled to the frame 102 or to the plurality of arms or band or other processing circuitry. In some implementations, the eyewear assembly 100 may include a wireless communications system 116 coupled to the frame 102 or to the plurality of arms or band. In some implementations, the eyewear assembly 100 may utilize the wireless communications system 116 to communicate with a companion device having the one or more processors and memory, such as a smartphone or tablet computer that the wearer can access to control playback of audio through the right extra-aural speaker 110 and the left extra-aural speaker 112 (e.g., via a media application executing in the companion device).

The system may utilize the one or more processors and memory to process output data of the plurality of sensors m1-m4 to determine locations of a plurality of anatomic features of the wearer (e.g., one or more of the anatomic features f1-f8). For example, sensors m1-m4 could include one or more sensors to detect anatomic features and distances to those anatomic features. Sensor m1 could detect the right earlobe f1 at a distance d1; sensor m2 could detect the left earlobe f2 at a distance d2; sensor m3 could detect the right eye f3 at a distance d3; and sensor m4 could detect the left eye f4 at a distance d4. In some cases, the distances can be determined from the sensors to centroids of the anatomic features. In another example, sensors m1-m4 could include a one or more sensors to detect anatomic features and angles between those anatomic features. For example, sensor m3 could detect the right eye f3 and a reference point, such as the nose f7, with an angle θ3 between them; and sensor m4 could detect the left eye f4 and the same reference point, e.g., the nose f7, with an angle θ4 between them.

The system may then detect an orientation of the eyewear assembly 100 relative to the wearer of the eyewear assembly 100 based on the locations of the plurality of anatomic features of the wearer. In some implementations, the system may utilize symmetry of the anatomic features as a baseline. For example, detecting the orientation may include calculating a first difference between the distance d1 to the right earlobe f1 and the distance d2 to the left earlobe f2, and comparing the first difference to a first threshold (e.g., an earlobe threshold); and/or calculating a second difference between the distance d3 to the right eye f3 and the distance d4 to the left eye f4, and comparing the second difference to a second threshold (e.g., an eye threshold). In another example, detecting the orientation may include calculating a difference between angles, such as the angle θ3 (e.g., the angle between the right eye f3 and the nose f7) and the angle θ4 (e.g., the angle between the left eye f4 and the nose f7), and comparing the difference to an angular threshold. In some implementations, the system may utilize a combination of distances and angles to determine the orientation. For example, the distance d1 equal to the distance d2, the distance d3 equal to the distance d4, and/or the angle θ3 equal to the angle θ4, may indicate a balanced orientation (e.g., the system need not correct audio signals driven to the plurality of extra-aural speakers). However, the distance d1 being greater than or less than the distance d2, the distance d3 being greater than or less than the distance d4, and/or the angle θ3 being greater than or less than the angle θ4, may indicate an imbalanced orientation (e.g., the system may then determine a correction to an audio signal to drive one or more extra-aural speakers of the plurality of extra-aural speakers).

In some cases, detecting the orientation may include determining that one extra-aural speaker is further from a wearer's ear than another extra-aural speaker is from the wearer's other ear. For example, with additional reference to FIG. 2, detecting the orientation may include determining that the left extra-aural speaker 112 has moved further from the left earlobe f2 (and that the right extra-aural speaker 110 has moved closer to the right earlobe f1). The detection may be based on the distance d2 being greater than the distance d1 by more than the threshold. In some cases, this may be caused by excessive movement and/or perspiration by the wearer resulting in the eyewear assembly 100 falling out of position. In other cases, this may be a result of the wearer having asymmetric anatomic features, e.g., one ear offset higher than the other ear, or an uneven head or nose, causing the extra-aural speakers to be out of position.

The system may then determine, based on the orientation, corrections to one or more audio signals to drive extra-aural speakers of the plurality of extra-aural speakers. In some implementations, the correction may include a level compensation, or an equalization adjustment, applied to an audio signal. For example, based on determining that the left extra-aural speaker 112 has moved further from the left earlobe f2 (and the right extra-aural speaker 110 has moved closer to the right earlobe f1), the system may increase gain of the audio signal to the left extra-aural speaker 112 (e.g., a level compensation applied to the left extra-aural speaker 112). In some implementations, the correction may include a change to information representing an HRTF associated with the wearer. For example, information representing the HRTF could be stored by a companion device in communication with the eyewear assembly 100. In the example of FIG. 2, the change may enable the HRTF to compensate for the change in position of the left extra-aural speaker 112 (e.g., further from the left earlobe f2). The system may then apply the correction to improve audio perceived by the wearer. As a result, the wearer may be able to hear sounds in a balanced manner, regardless of whether one or more extra-aural speakers move out of position, and/or regardless of whether the wearer has asymmetric anatomic features that cause the extra-aural speakers to be out of alignment.

In some implementations, the system may utilize the sensors m1-m4 to detect objects causing obstructions to the extra-aural speakers. For example, the sensors may detect hair or clothing between an ear and an extra-aural speaker (e.g., between the left ear canal f6 and the left extra-aural speaker 112). The system can then determine corrections to an audio signal driven to the extra-aural speaker (e.g., the left extra-aural speaker 112) based on the hair or clothing causing the obstruction. This may enable compensating the audio signal for the hair or clothing.

In some implementations, the system can utilize machine learning to predict the anatomic features, including with confidence percentages. To make the predictions, the system can utilize a machine learning model trained to detect anatomical features like the anatomical features f1-f8. For example, the machine learning model can be trained using a training data set including data samples representing anatomical features. The training can be periodic, such as by updating the machine learning model on a discrete time interval basis (e.g., once per week or month), or otherwise. The training data set may derive from multiple users or may be specific to a particular user (e.g., the user in FIGS. 1 and 2). The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

Figure 3:
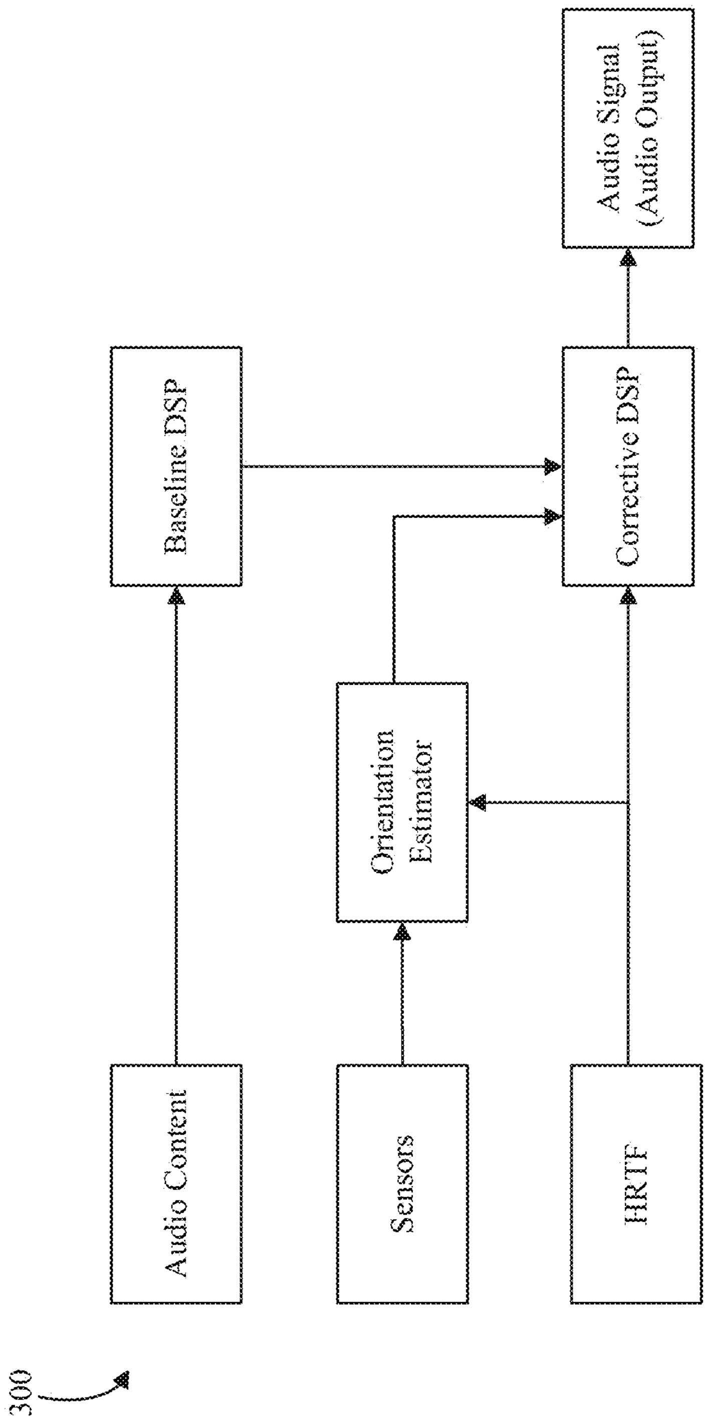
FIG. 3 is a block diagram of an example of a system for correcting audio signals based on an orientation of an eyewear assembly.

FIG. 3 is a block diagram of an example of a system 300 for correcting audio signals based on an orientation of an eyewear assembly (e.g., the eyewear assembly 100). The system 300 may be implemented by one or more processors or processing circuitries of the eyewear assembly (e.g., the SoC 114), one or more processors or processing circuitries of a companion device in communication with the eyewear assembly (e.g., via the wireless communications system 116), or a combination thereof.

The system 300 can receive audio content, such as streaming music, audio from a phone call, or audio providing noise cancellation. The system can apply a baseline digital signal processing (DSP) algorithm to the audio content to generate baseline audio signals configured to drive extra-aural speakers of the eyewear assembly (e.g., the right extra-aural speaker 110 and the left extra-aural speaker 112).

To correct audio signals based on orientation, the system 300 can utilize sensors (e.g., sensors m1-m4) to determine locations of a plurality of anatomic features of a wearer of the eyewear assembly. In some implementations, the system 300 can also receive information representing an HRTF associated with the wearer. For example, the HRTF could enable a priori determination of the user's anatomic features (e.g., locations of the right earlobe f1, the left earlobe f2, the right eye f3, the left eye f4, the right ear canal f5, the left ear canal f6, the nose f7, and/or the mouth f8). The system 300 can then utilize an orientation estimator to detect an orientation of the eyewear assembly relative to the wearer of the eyewear assembly (e.g., tilt and/or orientation estimation). The orientation may include a quantified estimation of movement, tilt, and/or obstructions of the eyewear assembly 100 and the plurality of extra-aural speakers (e.g., the right extra-aural speaker 110 and/or the left extra-aural speaker 112). The orientation may be based on the locations of the plurality of anatomic features of the wearer from the sensors and/or the information representing the HRTF. The system 300 can then utilize a corrective DSP algorithm to apply, based on the orientation from the orientation estimator, a correction to the baseline audio signal from the baseline digital DSP algorithm. In some implementations, the correction may include a level compensation, or an equalization adjustment, applied to the baseline audio signals. In some implementations, the correction may include a change to the information representing the HRTF. The system 300 can then output audio signals, generated by the corrective DSP algorithm, to drive the extra-aural speakers of the eyewear assembly. As a result, the audio signals may enable balanced audio for the user.

Figure 4:
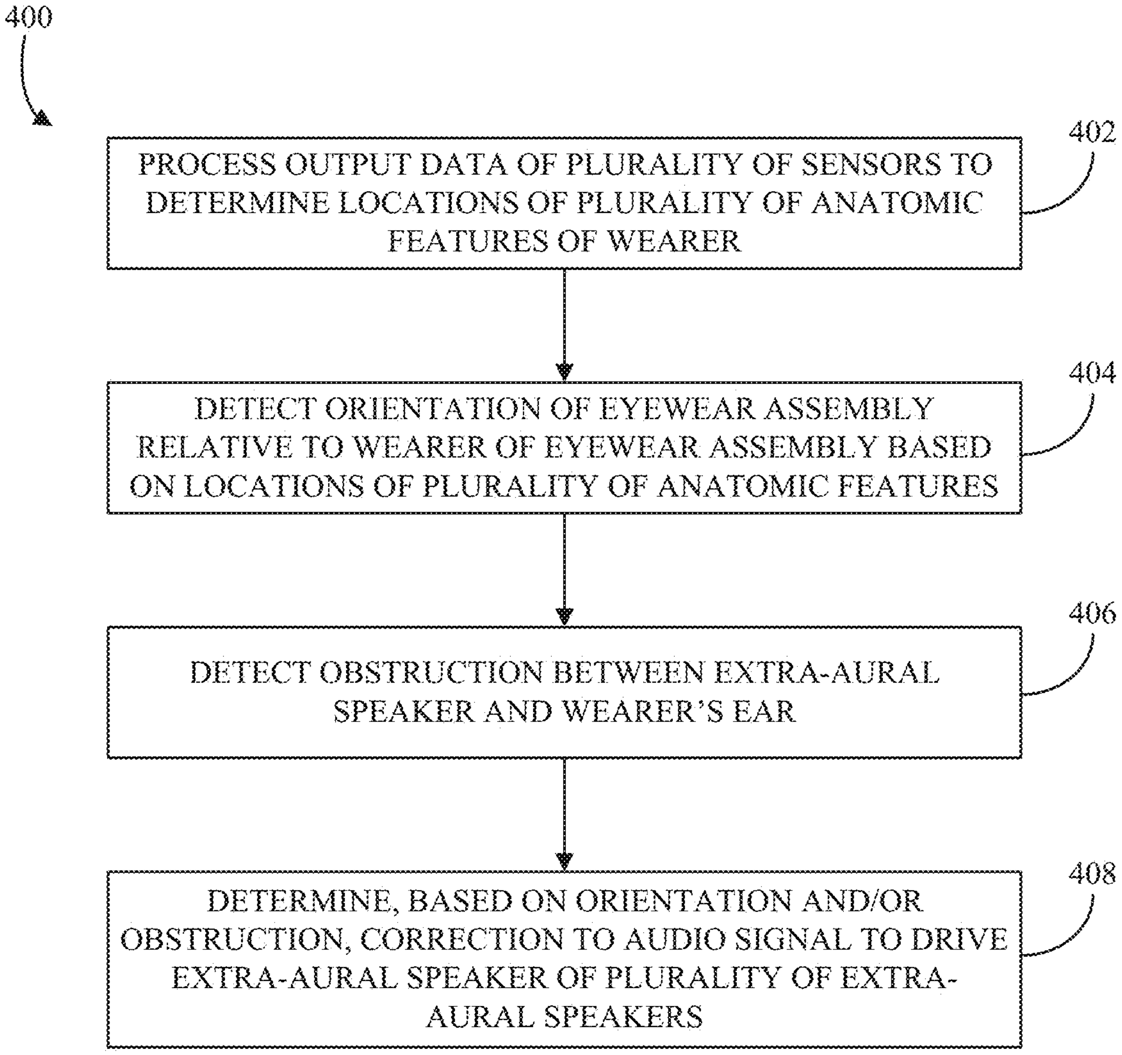
FIG. 4 is a flowchart of an example of a process for correcting audio signals based on an orientation of an eyewear assembly.

FIG. 4 is a flowchart of an example of a process 400 for correcting audio signals based on an orientation of an eyewear assembly. The process 400 can be executed using computing devices, such as the systems, hardware, and software described with respect to FIGS. 1-3. The process 400 can be performed, for example, by executing a machine-readable program or other computer-executable instructions, such as routines, instructions, programs, or other code. The operations of the process 400 or another technique, method, process, or algorithm described in connection with the implementations disclosed herein can be implemented directly in hardware, firmware, software executed by hardware, circuitry, or a combination thereof.

For simplicity of explanation, the process 400 is depicted and described herein as a series of operations. However, the operations in accordance with this disclosure can occur in various orders and/or concurrently. Additionally, other operations not presented and described herein may be used. Furthermore, not all illustrated operations may be required to implement a technique in accordance with the disclosed subject matter.

At operation 402, a system may process output data of a plurality of sensors to determine locations of a plurality of anatomic features of the wearer. For example, the system 300 may process output data of sensors m1-m4 to determine locations of one or more anatomic features f1-f8 of the wearer of the eyewear assembly 100. The sensors may include, for example, one or more ultrasonic sensors, optical sensors, cameras, laser range finders, electro-mechanical sensors, capacitive touch sensors, and/or strain gauge sensors. The anatomic feature may include, for example, one or more of eyes, pupils, ears, earlobes, ear canals, a nose, or a mouth.

At operation 404, the system may detect an orientation of the eyewear assembly relative to the wearer of the eyewear assembly based on the locations of the plurality of anatomic features of the wearer. For example, the system 300 may utilize sensors m1-m4 to detect an orientation of the eyewear assembly 100 relative to the wearer of the eyewear assembly based on the locations of the plurality of anatomic features f1-f8 of the wearer. In another example, the system 300 may utilize sensors m1-m2 to detect that the left extra-aural speaker 112 has moved further from the left earlobe f2, and that the right extra-aural speaker 110 has moved closer to the right earlobe f1 (e.g., the distance d2 being greater than the distance d1).

At operation 406, the system may also detect an obstruction between the extra-aural speaker and a wearer's ear. For example, the system 300 may detect an obstruction caused by hair or clothing between an extra-aural speaker and the wearer's ear (e.g., the left extra-aural speaker 112 and the wearer's left ear).

At operation 408, the system may determine, based on the orientation and/or the obstruction, a correction to an audio signal that is to drive an extra-aural speaker of the plurality of extra-aural speakers. For example, the system 300 may determine, based on the orientation and/or the obstruction, a correction to an audio signal to drive the left extra-aural speaker 112 (e.g., to compensate for the increased distance of d2 and/or the presence of hair or clothing interfering with sound to the ear). In some implementations, applying the correction may include applying a level compensation, equalization adjustment, and/or HRTF correction.

Figure 5:
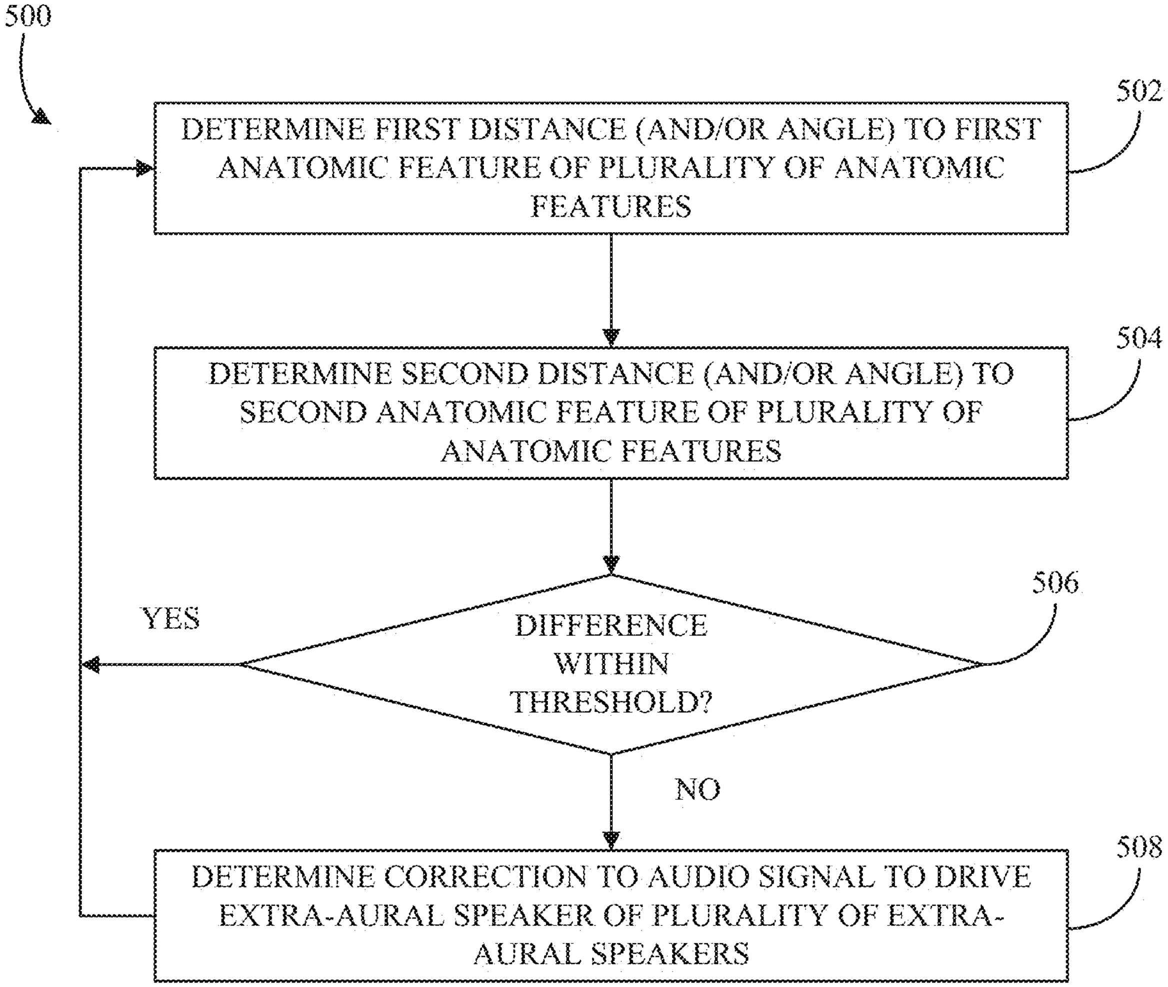
FIG. 5 is a flowchart of an example of a process for correcting audio signals by comparing distances or angles to a threshold.

FIG. 5 is a flowchart of an example of a process 500 for correcting audio signals by comparing distances or angles to a threshold. For example, one or more operations of the process 500 may be utilized in the process 400, such as operation 404. The process 500 can be executed using computing devices, such as the systems, hardware, and software described with respect to FIGS. 1-3. The process 500 can be performed, for example, by executing a machine-readable program or other computer-executable instructions, such as routines, instructions, programs, or other code. The operations of the process 500 or another technique, method, process, or algorithm described in connection with the implementations disclosed herein can be implemented directly in hardware, firmware, software executed by hardware, circuitry, or a combination thereof.

For simplicity of explanation, the process 500 is depicted and described herein as a series of operations. However, the operations in accordance with this disclosure can occur in various orders and/or concurrently. Additionally, other operations not presented and described herein may be used. Furthermore, not all illustrated operations may be required to implement a technique in accordance with the disclosed subject matter.

At operation 502, a system may utilize one or more sensors of an eyewear assembly (e.g., the eyewear assembly 100) having a plurality of extra-aural speakers (e.g., the right extra-aural speaker 110 and/or the left extra-aural speaker 112) to determine a first distance (or angle) to a first anatomic feature of a plurality of anatomic features. For example, the system 300 could utilize sensor m1 to determine the distance d1 to the right earlobe f1; sensor m3 to determine the distance d3 to the right eye f3; and/or sensor m3 to determine the angle θ3 between the right eye f3 and the nose f7.

At operation 504, the system may utilize one or more sensors of the eyewear assembly to determine a second distance (or angle) to a second anatomic feature of the plurality of anatomic features. For example, the system 300 could utilize sensor m2 to determine the distance d2 to the left earlobe f2; sensor m4 to determine the distance d4 to the left eye f4; and/or sensor m4 to determine the angle θ4 between the left eye f4 and the nose f7.

At operation 506, the system may calculate a difference between the first distance (or angle) and the second distance (or angle) and compare the difference to a threshold. For example, the system 300 could calculate a difference between the distance d1 and distance d2, a difference between the distance d3 and distance d4, and/or a difference between the angle θ3 and the angle θ4 and compare one or more of the differences to corresponding thresholds.

If the calculated difference is within the threshold ("Yes"), the system need not correct audio signals driven to the plurality of extra-aural speakers. For example, the system may determine that the eyewear assembly is positioned symmetrically, and/or that the plurality of extra-aural speakers are balanced. The system can return to operation 502 to resume monitoring orientation of the eyewear assembly. However, if the difference exceeds the threshold ("No"), at operation 508, the system may determine a correction to an audio signal that is to drive an extra-aural speaker of the plurality of extra-aural speakers. For example, the system 300 may determine, based on an orientation, a correction to an audio signal to drive the left extra-aural speaker 112 to compensate for differences between distance d1 and distance d2, distance d3 and distance d4, and/or angle θ3 and angle θ4, that are not within thresholds. In some implementations, applying the correction may include applying a level compensation, an equalization adjustment, and/or an HRTF correction. The system can then return to operation 502 to resume monitoring orientation of the eyewear assembly, such as to apply a next correction.

Some implementations may include a system, comprising an eyewear assembly including a frame configured to rest on a wearer's face; a plurality of extra-aural speakers; and a plurality of sensors; and one or more processors or processing circuitries configured to execute instructions stored in memory to process output data of the plurality of sensors to determine locations of a plurality of anatomic features of the wearer; detect an orientation of the eyewear assembly relative to the wearer of the eyewear assembly based on the locations of the plurality of anatomic features of the wearer; and determine, based on the orientation, a correction to an audio signal that is to drive an extra-aural speaker of the plurality of extra-aural speakers. In some implementations, detecting the orientation includes determining the extra-aural speaker is further from the wearer's ear than a second extra-aural speaker of the plurality of extra-aural speakers is from the wearer's other ear. In some implementations, detecting the orientation includes calculating a difference between a first distance to a first anatomic feature of the plurality of anatomic features and a second distance to a second anatomic feature of the plurality of anatomic features. In some implementations, the correction includes at least one of a level compensation or an equalization adjustment applied to the audio signal. In some implementations, the processor or processing circuitry is further configured to execute instructions stored in the memory to receive, via a wireless communications system, information representing an HRTF associated with the wearer. In some implementations, the correction includes a change to information representing an HRTF associated with the wearer. In some implementations, the processor or processing circuitry is further configured to execute instructions stored in the memory to detect an obstruction between the extra-aural speaker and a wearer's ear; and determine a second correction to the audio signal based on the obstruction. In some implementations, the plurality of anatomic features includes eyes and ears.

Some implementations may include a method, comprising determining locations of a plurality of anatomic features of a wearer of an eyewear assembly based on output data of a plurality of sensors of the eyewear assembly, wherein the eyewear assembly includes a frame configured to rest on a wearer's face and a plurality of extra-aural speakers; detecting an orientation of the eyewear assembly relative to the wearer of the eyewear assembly based on the locations of the plurality of anatomic features of the wearer; and determining, based on the orientation, a correction to an audio signal that is to drive an extra-aural speaker of the plurality of extra-aural speakers. In some implementations, detecting the orientation includes determining the extra-aural speaker is closer to the wearer's ear than a second extra-aural speaker of the plurality of extra-aural speakers is to the wearer's other ear. In some implementations, detecting the orientation includes comparing a difference between a first distance to a first anatomic feature of the plurality of anatomic features and a second distance to a second anatomic feature of the plurality of anatomic features to a threshold. In some implementations, the method may further include applying the correction by at least one of level compensating or equalizing the audio signal. In some implementations, the method may further include receiving, via a nearfield communications system, information representing an HRTF associated with the wearer. In some implementations, the method may further include detecting hair between the extra-aural speaker and a wearer's ear; and determining a second correction to the audio signal based on the hair. In some implementations, the plurality of anatomic features includes pupils and earlobes.

Some implementations may include a non-transitory computer readable medium storing instructions operable to cause one or more processors or processing circuitries to perform operations comprising determining locations of a plurality of anatomic features of a wearer of an eyewear assembly based on output data of a plurality of sensors of the eyewear assembly, wherein the eyewear assembly includes a frame configured to rest on a wearer's face and a plurality of extra-aural speakers; detecting an orientation of the eyewear assembly relative to the wearer of the eyewear assembly based on the locations of the plurality of anatomic features of the wearer; and determining, based on the orientation, a correction to an audio signal that is to drive an extra-aural speaker of the plurality of extra-aural speakers. In some implementations, detecting the orientation includes determining the extra-aural speaker is further from the wearer's ear than a second extra-aural speaker of the plurality of extra-aural speakers is from the wearer's other ear. In some implementations, detecting the orientation includes calculating a difference between a first angle to a first anatomic feature of the plurality of anatomic features and a second angle to a second anatomic feature of the plurality of anatomic features. In some implementations, the correction includes changing information representing an HRTF associated with the wearer. In some implementations, the operations may further include detecting clothing between the extra-aural speaker and a wearer's ear; and determining a second correction to the audio signal based on the clothing.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

In utilizing the various aspects of the embodiments, it would become apparent to one skilled in the art that combinations or variations of the above embodiments are possible for correcting audio signals driven to extra-aural speakers of an eyewear assembly based on an orientation of the eyewear assembly. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A system, comprising:

an eyewear assembly including:

a frame configured to rest on a wearer's face;

a plurality of extra-aural speakers; and a plurality of sensors; and one or more processing circuitries configured to execute instructions stored in memory to:

process output data of the plurality of sensors to determine locations of a plurality of anatomic features of the wearer;

detect an orientation of the eyewear assembly relative to the wearer of the eyewear assembly based on the locations of the plurality of anatomic features of the wearer; and determine, based on the orientation, a correction to an audio signal that is to drive an extra-aural speaker of the plurality of extra-aural speakers.

2. The system of claim 1, wherein detecting the orientation includes determining the extra-aural speaker is further from a wearer's ear than a second extra-aural speaker of the plurality of extra-aural speakers is from the wearer's other ear.

3. The system of claim 1, wherein detecting the orientation includes calculating a difference between a first distance to a first anatomic feature of the plurality of anatomic features and a second distance to a second anatomic feature of the plurality of anatomic features.

4. The system of claim 1, wherein the correction includes at least one of a level compensation or an equalization adjustment applied to the audio signal.

5. The system of claim 1, wherein the one or more processing circuitries are further configured to execute instructions stored in the memory to:

receive, via a wireless communications system, information representing a head-related transfer function (HRTF) associated with the wearer.

6. The system of claim 1, wherein the correction includes a change to information representing an HRTF associated with the wearer.

7. The system of claim 1, wherein the one or more processing circuitries are further configured to execute instructions stored in the memory to:

detect an obstruction between the extra-aural speaker and a wearer's ear; and determine a second correction to the audio signal based on the obstruction.

8. The system of claim 1, wherein the plurality of anatomic features includes eyes and ears.

9. A method, comprising:

determining locations of a plurality of anatomic features of a wearer of an eyewear assembly based on output data of a plurality of sensors of the eyewear assembly, wherein the eyewear assembly includes a frame configured to rest on a wearer's face and a plurality of extra-aural speakers;

detecting an orientation of the eyewear assembly relative to the wearer of the eyewear assembly based on the locations of the plurality of anatomic features of the wearer; and determining, based on the orientation, a correction to an audio signal that is to drive an extra-aural speaker of the plurality of extra-aural speakers.

10. The method of claim 9, wherein detecting the orientation includes determining the extra-aural speaker is closer to a wearer's ear than a second extra-aural speaker of the plurality of extra-aural speakers is to the wearer's other ear.

11. The method of claim 9, wherein detecting the orientation includes comparing a difference between a first distance to a first anatomic feature of the plurality of anatomic features and a second distance to a second anatomic feature of the plurality of anatomic features to a threshold.

12. The method of claim 9, further comprising:

applying the correction by at least one of level compensating or equalizing the audio signal.

13. The method of claim 9, further comprising:

receiving, via a nearfield communications system, information representing a head-related transfer function (HRTF) associated with the wearer.

14. The method of claim 9, further comprising:

detecting hair between the extra-aural speaker and a wearer's ear; and determining a second correction to the audio signal based on the hair.

15. The method of claim 9, wherein the plurality of anatomic features includes pupils and earlobes.

16. A non-transitory computer readable medium storing instructions operable to cause one or more processing circuitries to perform operations comprising:

determining locations of a plurality of anatomic features of a wearer of an eyewear assembly based on output data of a plurality of sensors of the eyewear assembly, wherein the eyewear assembly includes a frame configured to rest on a wearer's face and a plurality of extra-aural speakers;

detecting an orientation of the eyewear assembly relative to the wearer of the eyewear assembly based on the locations of the plurality of anatomic features of the wearer; and determining, based on the orientation, a correction to an audio signal that is to drive an extra-aural speaker of the plurality of extra-aural speakers.

17. The non-transitory computer readable medium storing instructions of claim 16, wherein detecting the orientation includes determining the extra-aural speaker is further from a wearer's ear than a second extra-aural speaker of the plurality of extra-aural speakers is from the wearer's other ear.

18. The non-transitory computer readable medium storing instructions of claim 16, wherein detecting the orientation includes calculating a difference between a first angle to a first anatomic feature of the plurality of anatomic features and a second angle to a second anatomic feature of the plurality of anatomic features.

19. The non-transitory computer readable medium storing instructions of claim 16, wherein the correction includes changing information representing a head-related transfer function (HRTF) associated with the wearer.

20. The non-transitory computer readable medium storing instructions of claim 16, wherein the operations further comprise:

detecting clothing between the extra-aural speaker and a wearer's ear; and determining a second correction to the audio signal based on the clothing.

21. A system, comprising:

headgear including:

a frame to rest on a wearer's face;

a plurality of extra-aural speakers; and a plurality of sensors; and one or more processors to:

process output data of the plurality of sensors to determine locations of a plurality of anatomic features of the wearer;

detect an orientation of the headgear relative to the wearer of the headgear based on the locations of the plurality of anatomic features of the wearer; and determine, based on the orientation, a correction to an audio signal that is to drive an extra-aural speaker of the plurality of extra-aural speakers.

22. The system of claim 21, wherein the plurality of sensors are used to detect at least one of distances to the anatomic features or angles between the anatomic features.

23. The system of claim 22, wherein detecting the orientation includes 1) calculating a difference between the distances to the anatomic features or angles between the anatomic features, and 2) comparing the difference to a threshold.

* * * * *